Figure 1:
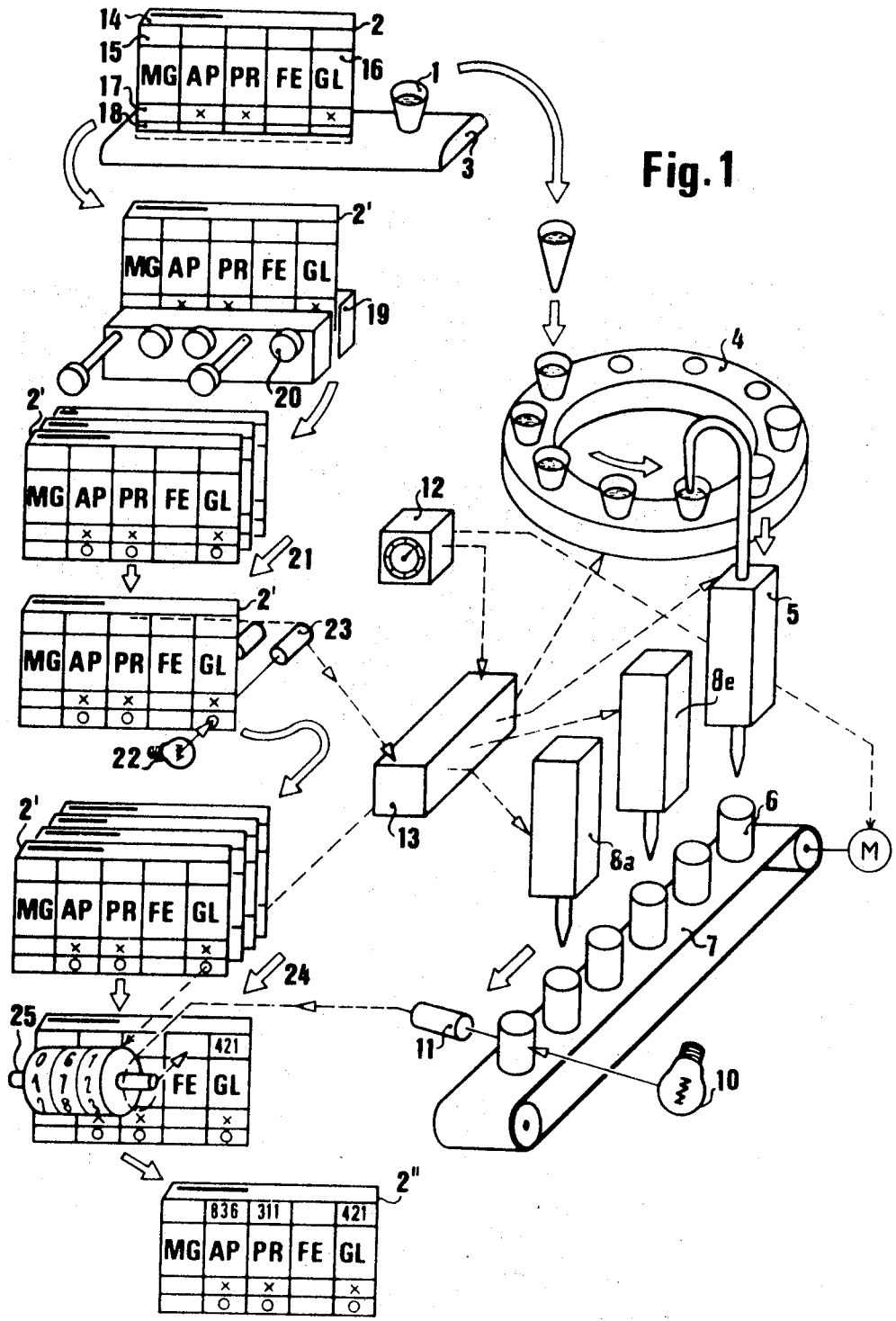

United States Patent
Oberli

[15] 3,660,638
[45] May 2, 1972

[54] AUTOMATIC ANALYZING APPARATUS FOR LIQUID SPECIMENS

[72] Inventor: Rudolf Oberli, Grubenstrasse 9, CH-4900 Langenthal, Switzerland

[22] Filed: Aug. 24, 1970

[21] Appl. No.: 66,469

[30] Foreign Application Priority Data

Aug. 28, 1969 Switzerland..........................13028/69

[52] U.S. Cl......................235/61.6 R, 23/253, 235/61.11 E, 356/39
[51] Int. Cl..................G01n 29/02, G01n 33/16, G06k 7/10
[58] Field of Search..................235/151, 35, 61.6 R, 61.6 H, 235/61.9 R, 61.11 E, 61.11 R; 250/218; 23/253, 259; 356/39–41

[56] References Cited

UNITED STATES PATENTS

| | | | |
|---|---|---|---|
| 3,497,320 | 2/1970 | Blackburn | 23/230 |
| 3,266,298 | 8/1966 | Whitehead | 73/53 |
| 3,489,525 | 1/1970 | Natelson | 23/253 |
| 3,571,596 | 3/1971 | Frank | 250/106.SC |
| 2,275,396 | 3/1942 | Johnson | 164/115 |
| 3,523,737 | 8/1970 | Wood | 356/246 |
| 3,549,994 | 12/1970 | Rothermel | 23/253 X |
| 3,565,582 | 2/1971 | Young | 23/253 X |
| 3,572,998 | 3/1971 | Anthon | 23/253 X |
| 3,531,258 | 9/1970 | Merrifield | 23/253 X |

*Primary Examiner*—Maynard R. Wilbur
*Assistant Examiner*—Robert M. Kilgore
*Attorney*—Lawrence E. Laubscher

[57] ABSTRACT

Method and apparatus for performing at least one chemical and/or physical analysis on a specimen, characterized in that an origin record associated with each specimen is marked with a machine-readable code that is operable to activate selected ones of a series of analyzing stations in timed relation to the transport of the specimen therethrough. According to a first embodiment, inspection means are provided for measuring a physical property of the specimen following passage through said station, whereupon this measured property is then recorded directly on the origin record. In accordance with a second embodiment, a number of copies are made of the origin card corresponding to the number of analyses to be performed, whereupon the properties measured by said inspection means for each station are recorded on the said copies, respectively.

6 Claims, 2 Drawing Figures

INVENTOR.
Rudolf Oberli

AUTOMATIC ANALYZING APPARATUS FOR LIQUID SPECIMENS

The present invention relates to a method and apparatus for performing one or more chemical and/or physical analyses on a specimen, characterized in that an origin record is associated with each specimen to be analyzed and contains the necessary data concerning the origin of the specimen, together with information regarding the various analyses to be performed thereon. The origin records are fed into a fully automatic analyzing apparatus for data processing in the same sequence that the associated samples are conducted through the successive stations of the analyzing apparatus.

It is the object of the present invention to provide a method and apparatus for the control of an analyzing system which is adapted to be selectively converted to different analyzing programs in a fully automatic manner for successive samples of the specimens. In accordance with the present invention, the aforementioned origin records are initially provided with machine-readable symbols prior to the passage thereof through conventional read-out means, which symbols characterize the analyzing programs to be performed in the analyzing apparatus for the respective samples. By virtue of the subsequent control of the analyzing apparatus in dependence upon these identifying symbols, the various stations of the analyzing system are selectively activated to perform the desired analyzing programs, respectively.

In accordance with a specific object of the invention, result indicating means are provided within the analyzing apparatus for marking on each origin record the result and/or results of the analyzing programs that have been carried out, whereby these results will appear in a distinct coordination with respect to the machine-readable identifying symbols.

Figure 2:
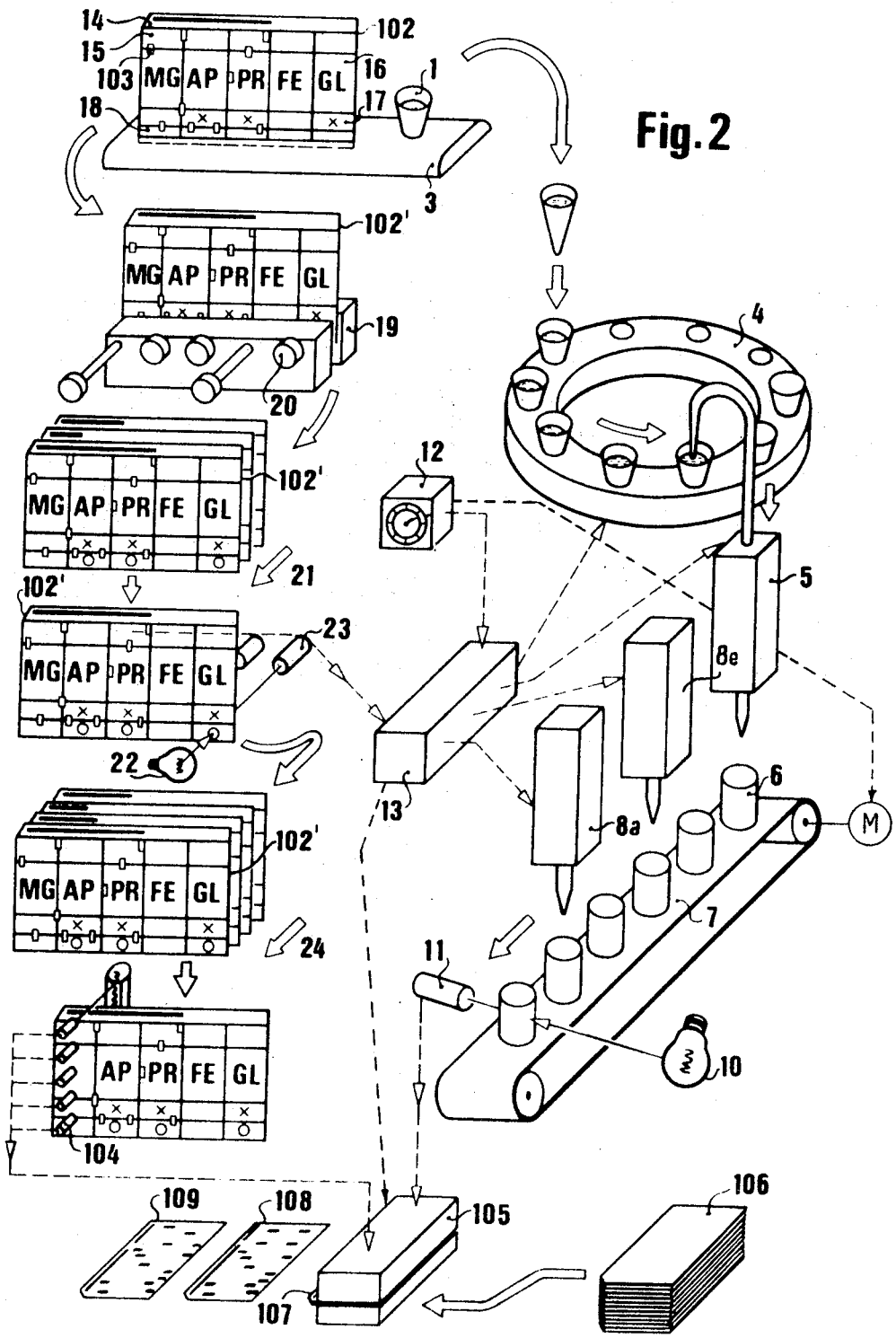

Other objects and advantages of the present invention will become apparent from a study of the following specification, when viewed in the light of the accompanying drawing, in which:

FIG. 1 illustrates diagrammatically a first embodiment of the invention wherein the results of the analyses are indicated on the original origin card; and FIG. 2 illustrates a second embodiment wherein the results of the analyses are presented on separate copies of the origin record.

The right and left hand sides of each figure of the drawing illustrate the flow paths of the specimen samples and the origin record, respectively, as shown by the arrows. For the purpose of clearly indicating the processing steps which each origin record undergoes on this path, one and the same record has been illustrated in each phase.

Referring first to FIG. 1, the liquid specimen contained within the specimen container 1 is conveyed to the input of the automatic analyzing apparatus on a support 3 together with the origin card or record 2 associated therewith. In order to prepare the specimen for automatic analysis, the specimen container is inserted into a specimen magazine 4 that rotates in a step-by-step manner. The specimen sample dispensing means 5 removes the required amount of liquid sample for each analyzing program from the specimen container 1 and delivers sample portions thereof to a plurality of successive processing containers 6 the number of which corresponds with the number of analyses to be performed. The processing containers 6 are then transported in a step-by-step manner as coordinated by the clock means 12, whereupon the reagent dispensing means 8a–8e disposed along the conveying path are selectively activated in timed relation to the transport of the processing containers, in accordance with the programmed analysis. Following exit from the analyzing stations, 8a–8e, each processing container is inspected (for example, by photometer means 10, 11) to measure a physical characteristic of the treated specimen portion, which measured characteristic is then recorded on the origin record by the result printer 25. The coordination between the magazine 4, the conveyor 7, the specimen dispensing means 5, the reagent dispensing means 8a—8e and the result printing means 25 is effected by program control means 13 as determined by the clock means 12 and the code reader means 22, 23. One example of suitable program control means 13 is set forth in the copending U.S. Pat. application, Ser. No. 848,852 filed Aug. 11, 1969, in the name of Rudolf Greiner entitled "Sample Analyzing Apparatus."

Referring now more particularly to the left hand side of FIG. 1, the origin record 2 is divided into five horizontal lines 14–18. The upper line 14 indicates the origin of the specimen, and the lower four lines are divided into five columns that correspond with the tests that can be performed by the analyzing apparatus. The third line 16 identifies the five possible tests of the described apparatus as being magnesium (MG), alkaline phosphatase (AP), protein (PR), iron (FE) and glucose (GL). Of course it is to be understood that the type and number of tests may be greatly varied, and that on the order of thirty or more tests are generally performed in a typical installation.

Prior to insertion into the system, the origin records are manually marked on line 17 with marks (such as the mark "X") representative of the tests to be performed. In the illustrated embodiment, the origin card has been marked for the tests alkaline phosphatase, (AP), protein (PR) and glucose (GL). The two remaining programs (iron FE and magnesium MG) are of no concern with regard to this specific sample, and hence the corresponding columns are left unmarked.

In order to provide the desired adaptability of the system for various analyses, the marked origin record 2 is then introduced into perforator means 19 that punches a machine-readable code in the horizontal line 18 corresponding with the columns manually marked with the symbol "X" in strip 17. The punched record 2' is then stored in the input magazine 21 until the corresponding specimen is transported by the specimen magazine 4 to the dispensing means 5, whereupon the record 2' is then fed to the card reader station at which the apertures are scanned optically by means of light source 22 that scans the punch apertures in a step-by-step manner relative to five photocells 23 arranged for reading the five analyzing columns, respectively. In the illustrated example, the photocell means 23 transmit three appropriately timed control pulses to the central program control means 13, whereupon the punched card 2' is stored temporarily in the second magazine 24.

In accordance with the three signals transmitted to the central program control means 13, the specimen dispensing means 5 is operated to dispense sample portions of the specimen into three successive processing containers 6 on the conveyor 7 for transport beneath the reagent dispensing means 8a–8e. Owing to the control afforded by central program control means 13, the selected reagent dispensing means 8b, 8c and 8e (for determining alkaline phosphatase, protein and glucose, respectively) are activated in timed sequence relative to the passage thereby of the corresponding series of three processing containers. As the selected specimen processing container 6 approach the inspection station (10, 11) at the end of the conveyor, the corresponding punched specimen origin card 2' is simultaneously fed from the temporary storage magazine 24 to the printer means 25, whereupon the printer means successively records the values of a given physical characteristic as measured by the photometer means (10, 11) during transport of the corresponding three processing containers thereby. In the illustrated example, for the analyzing program resulting from reagent of the addition of a glucose-determining reagent to a portion of the specimen, the concentration of the resultant solution was indicated by the photometer means as being 421 mg/100 ml, which value is printed on line 15, column 5. Successively, the processing containers for the reagents for determining protein and alkaline phosphatase are inspected and the measured values 311 and 836 are printed on columns 3 and 2, respectively, of line 15. Consequently, the processed origin card 2'' emitted from the apparatus contains in line 14 an indication of the origin of the specimen, and on line 15 the results of selected analyzing tests performed automatically on the specimen as positively determined by the machine-readable code of line 18.

If a physical evaluation of the analytical results is desired (for example, the automatic compilation of lists of the results with a statistical calculation of errors), use is made of the origin record 102 of FIG. 2. In this embodiment, the card—prior to insertion into the card processing section—is provided with the required data relative to the origin of the specimen, said data being punched into the order card 102 in machine readable punch code 103. The specimen 1 and the card 102 are then processed in the same manner as described above.

The punch-card writing 103 and the arrangement of the punching dies 20 are so adjusted and matched relative to each other that the reading of the apertures characterizing the desired analyzing programs in the lines 18 is not impaired, whereby the signals produced within the light-receiving means 23 will reliably control the analyzing apparatus. It is also desirable that the indications of the lines 16 and 17 be maintained imperforate.

FIG. 2 illustrates how the result of the analytical tests determined by the photometer means 10, 11 is recorded. After having passed through the delivery magazine 24, the control record 102' reaches a punch card reader 104 which reads the indication punched into the card 102' concerning the origin of the respectively coordinated specimen 1 and transfers this information to a perforator 105. The first analytical result as well as a recognizing signal for glucose GL arrive in suitable form at the perforator 105 for punch recording on the blank copy records supplied by storage reservoir 106.

The perforator 105 then reproduces in punch-card writing the data concerning the origin of the sample, thereby producing a first copy 107 of the order card 102'. Simultaneously, the measured test result is also punched on the copy 107, whereupon the copy 107 leaves the perforator.

When the second measuring result (namely, that for protein PR) is obtained, a card is again removed from the storage reservoir 106 and a second copy 108 of the same order card 102' is made with the same indications concerning the origin of the sample. The measuring result for protein is punched in and the second copy 108, whereupon this card is then discharged from the perforator.

After a third copy 109 has been produced in an analogous manner for alkaline phosphatase, the recording of the results of the respective specimen portions is terminated. Accordingly, the copies 107, 108, 109 are coordinated with the respective analyzing programs characterized for execution on the control record 102'. The result of this analyzing program has been recorded merely on the corresponding copy of the order card, not on the order card 102' itself. The latter is no longer needed after reading of the data concerning the origin of the sample and can either be filed or destroyed. The copies 107, 108, 109 are then supplied to the data processing station for tabulation, sorting and/or mixing. This multiple use is an obvious advantage resulting from the recording if results on punched cards according to the embodiment of FIG. 2.

On the other hand, the analyzing method of FIG. 1 offers the advantage that the results are indicated on the record which the operator himself has prepared regarding the analyzing programs to be carried out. Therefor the operator is in a position to check particularly whether all of the desired investigations have indeed been performed correctly.

These specific requirements do not preclude the use of the combination of the methods of FIGS. 1 and 2, along with a corresponding provision of the output members, such as, for example the result printer and the reader for the punch-card writing 104.

According to a further modification of the disclosed analyzing apparatus, it is also possible to make copies with mechanically readable symbols of each of the introduced control records 2, 102, either prior to or during processing, which copies, in turn, control the analyzing stations that may be freely selected from one sample to another. Consequently, the results of the analyses may be obtained as they are produced. In this method, alternate types of control records, such as perforated tapes and magnetic bands, may also be employed.

While in accordance with the provisions of the Patent Statutes the preferred form and embodiments of the invention have been illustrated and described, it will be apparent that various modifications may be made in the described method and apparatus without deviating from the basic inventive concepts.

What is claimed is:

1. Apparatus for automatically performing at least one of a plurality of selectable analyses of a liquid specimen, comprising a plurality of normally de-activated reagent dispensing means ($8a - 8e$) each operable to dispense a different reagent;

register means (2') containing at least one control signal each corresponding with a desired analysis that is to be performed on the specimen;

sample dispensing means (5) operable by said register means for dispensing a separate specimen sample for each of the control signals contained in said register means;

conveyor means (7) for conveying each of said samples in succession adjacent each of said reagent dispensing means;

central program control means (13) operable by said register means for activating at least one of the reagent dispensing means that corresponds with said register control signal when said sample is adjacent thereto, thereby to deposit the selected reagent in said sample; and means (10, 11) for measuring a physical property of the resulting mixture of said reagent and said specimen sample.

2. Apparatus as defined in claim 1, and further including clock means (12) for synchronizing the operation of said conveyor means relative to the operation of said central program control means.

3. Apparatus as defined in claim 1, wherein said register means comprises a record card (2); and further including means (25) for recording on said record card the value of the measured physical property of said mixture.

4. Apparatus as defined in claim 3, and further including register input means (19) for recording said control signals on said card in accordance with the desired analyses to be performed.

5. Apparatus as defined in claim 4, and further including a card reader station (22, 23); specimen magazine means (4) for transporting said specimen toward said sample dispensing means; and input card magazine means (21) for transporting said record card from said register input means to said card reader station in timed relation relative to said specimen magazine means.

6. Apparatus as defined in claim 5, and further including output card magazine means (24) for transporting said record card from said card reader to said recording means in timed relation relative to said conveyor means.

* * * * *